US010289877B2

(12) United States Patent
Havens

(10) Patent No.: US 10,289,877 B2
(45) Date of Patent: May 14, 2019

(54) DIRECTIONAL ANTENNA FOR RFID TAG FINDER

(71) Applicant: Hand Held Products, Inc., Fort Mill, SC (US)

(72) Inventor: William H. Havens, Syracuse, NY (US)

(73) Assignee: HAND HELD PRODUCTS, INC., Fort Mill, SC (US)

(*) Notice: Subject to any disclaimer, the term of this patent is extended or adjusted under 35 U.S.C. 154(b) by 462 days.

(21) Appl. No.: 14/494,117

(22) Filed: Sep. 23, 2014

(65) Prior Publication Data

US 2015/0084744 A1   Mar. 26, 2015

Related U.S. Application Data

(60) Provisional application No. 61/881,256, filed on Sep. 23, 2013.

(51) Int. Cl.
*H04Q 5/22* (2006.01)
*G06K 7/10* (2006.01)

(52) U.S. Cl.
CPC ..... *G06K 7/10128* (2013.01); *G06K 7/10356* (2013.01); *G06K 7/10386* (2013.01)

(58) Field of Classification Search
CPC ........... G06K 7/10128; G06K 7/10356; G06K 7/10386
USPC ....................................................... 340/10.3
See application file for complete search history.

(56) References Cited

U.S. PATENT DOCUMENTS

| 7,541,927 B2 | 6/2009 | Dupler et al. |
| 8,248,263 B2 | 8/2012 | Shervey et al. |
| 8,816,821 B2* | 8/2014 | Iwahashi ............... G06K 17/00 340/10.1 |
| 9,949,001 B2* | 4/2018 | Yanagawa ............... H04Q 9/00 |
| 2002/0036569 A1 | 3/2002 | Martin |
| 2008/0231421 A1* | 9/2008 | Tuttle ............... G06K 19/07749 340/10.1 |
| 2009/0160638 A1* | 6/2009 | Jesme .................. G01S 13/825 340/539.11 |
| 2010/0188211 A1* | 7/2010 | Brommer ............... G06K 17/00 340/539.32 |
| 2010/0328037 A1* | 12/2010 | Thomas .................. F25D 29/00 340/10.1 |
| 2011/0210849 A1* | 9/2011 | Howard ............. G08B 13/1427 340/539.32 |
| 2013/0028131 A1 | 1/2013 | Davidson et al. |

OTHER PUBLICATIONS

Sarabandi et al; "Reducing Antenna Visual Signature Using Meta-Materials;" U.S. Army Communications-Electronics Research, Development & Engineering Center; Nov. 28, 2006.

Kuo et al; "Analysis of a 900/1800 MHz Dual-Band Loop Antenna on a Metallic Handset Proximate to a Head Model;" Department of Electrical Engineering, National Cheng Kung University; pp. 1170-1172.

\* cited by examiner

*Primary Examiner* — Zhen Y Wu

(74) *Attorney, Agent, or Firm* — Oliff PLC; R. Brian Drozd

(57) ABSTRACT

A system may include a mobile device comprising an antenna system. The antenna system may include a first antenna to determine a presence of a transponder within an area and a second antenna comprising a directional radiation pattern and that is configured to sweep the area to determine a direction of the transponder. The first antenna may be separate from the second antenna.

19 Claims, 9 Drawing Sheets

DIRECTIONAL ANTENNA FOR RFID TAG FINDER

CROSS-REFERENCE TO RELATED APPLICATIONS

The present application claims the benefit of priority to U.S. Provisional Patent Application No. 61/881,256, filed on Sep. 23, 2013, which is incorporated by reference herein in its entirety.

FIELD

The invention is generally related to radio frequency identifier (RFID) devices and some embodiments are related to RFID engines with a built-in antenna.

BACKGROUND

RFID methods are widely used in a number of applications, including smart cards, item tracking in manufacturing and retail, etc. RFID tags are often used in trucking and warehousing environments. On some occasions, the user needs to locate a specific package among a group of packages. RFID readers are omnidirectional and thus, cannot determine the specific location of an RFID tag.

SUMMARY

There is provided an RFID reader or mobile device which is configured to determine the location of an RFID tag using one or more antennas.

In one aspect, a system may include a mobile device comprising an antenna system. The antenna system may include a first antenna to determine a presence of a transponder within an area and a second antenna comprising a directional radiation pattern and that is configured to sweep the area to determine a direction of the transponder. The first antenna may be separate from the second antenna.

In another aspect, a method may include the following: activating a first antenna, determining, by the first antenna, the general presence of a transponder in an area based on a signal received at the first antenna from the transponder; activating a second antenna designed to have a null or minimum in a first direction and a radiation pattern in all directions other than the first direction; and identifying, by the second antenna, a location of the transponder within the area in response to a lack of response to the second antenna when the null or minimum is directed toward the transponder.

In another aspect, a mobile device may include an antenna system. The antenna system may include a first antenna to determine a presence of a transponder within an area; and a second antenna including a directional radiation pattern and that is configured to sweep the area to determine a direction of the transponder.

In yet another aspect, a system may include a RFID reader comprising a nulling antenna. The nulling antenna outputs a null or minimum extending only in one direction so that when the null is directed toward a transponder, the RFID reader is prevented from receiving signals from the transponder. The nulling antenna continuously sweeps about an axis to determine: (1) the presence based on receipt of the signal when a maximum of the antenna is directed toward the transponder and (2) a direction of the transponder based on a lack of signal from the transponder when the null or minimum is pointed toward the transponder.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale, emphasis instead generally being placed upon illustrating the principles of the invention. In the drawings, like numerals are used to indicate like parts throughout the various views.

DETAILED DESCRIPTION OF THE INVENTION

In one embodiment, there is provided a reader, such as an encoded information reading (EIR) terminal, comprising a radio frequency identifier (RFID) reading device. The RFID reader can be configured to read RFID tags containing encoded messages. In one embodiment, the RFID reader can be configured to read a RFID tag containing an encoded message and output raw message data containing the encoded message. In another embodiment, the RFID reader can be configured to read a RFID tag containing an encoded message and output decoded message data corresponding to the encoded message.

Various embodiments of the RFID reader can be used in a numerous applications, including but not limited to, authentication and access control systems (for example, using smart cards), item tracking in manufacturing and retail, etc. A smart card is an identification card (e.g., a credit card, a pass card) which does not need to be swiped or otherwise physically contacted by a card reader. This capability can be implemented by placing a RFID tag in the card. Item tracking can be implemented by placing a RFID tag on each individual item. In retail, item tracking with RFID tags can be used in conjunction with other technologies such as bar code scanning and payment terminals. Item tracking with RFID tags can be used in loss prevention systems by placing an RFID tag into merchandise items and placing sensors at exit points. If an exit sensor detects a tagged item with a tag, which was not deactivated at the checkout, an alarm can go off.

Figure 1A:
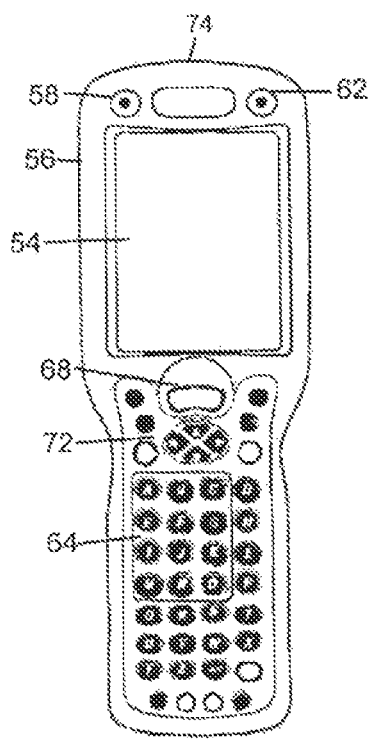
FIGS. 1A, 1B, and 1C schematically illustrate views of one embodiment of a RFID reader.

One embodiment of RFID reader 100 is shown in FIGS. 1A (front panel view), 1B (side panel view), and 1C (bottom panel view). RFID reader 100 can comprise housing 52 within which other components of RFID reader 100 can be disposed. LCD screen display with touch screen sensor 54 can be disposed on the front panel 56. Also disposed on front panel 56 can be decode LED 58, scan LED 62, and keyboard 64 including scan key 68 and navigation keys 72. Imaging window 74 can be disposed on the top panel of housing 52. Disposed on the side panel (best viewed in FIG. 1B) can be infrared communication port 76, access door to a secure digital (SD) memory interface 78, audio jack 80, and hand strap 82. Disposed on the bottom panel (best viewed in FIG. 1C) can be multi-pin mechanical connector 84 and hand strap clip 86.

Figure 1B:
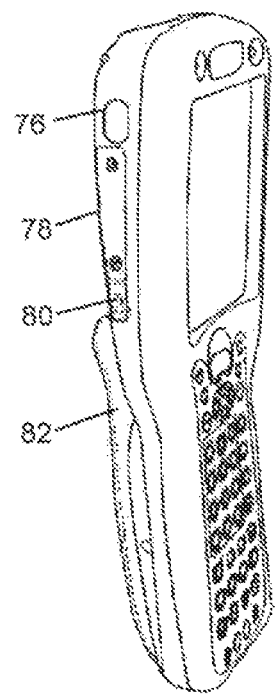
Figure 1C:

While FIGS. 1A-1C illustrate a hand held housing, a skilled artisan would appreciate the fact that other types and form factors of terminal housings are within the scope of this disclosure.

Figure 2:
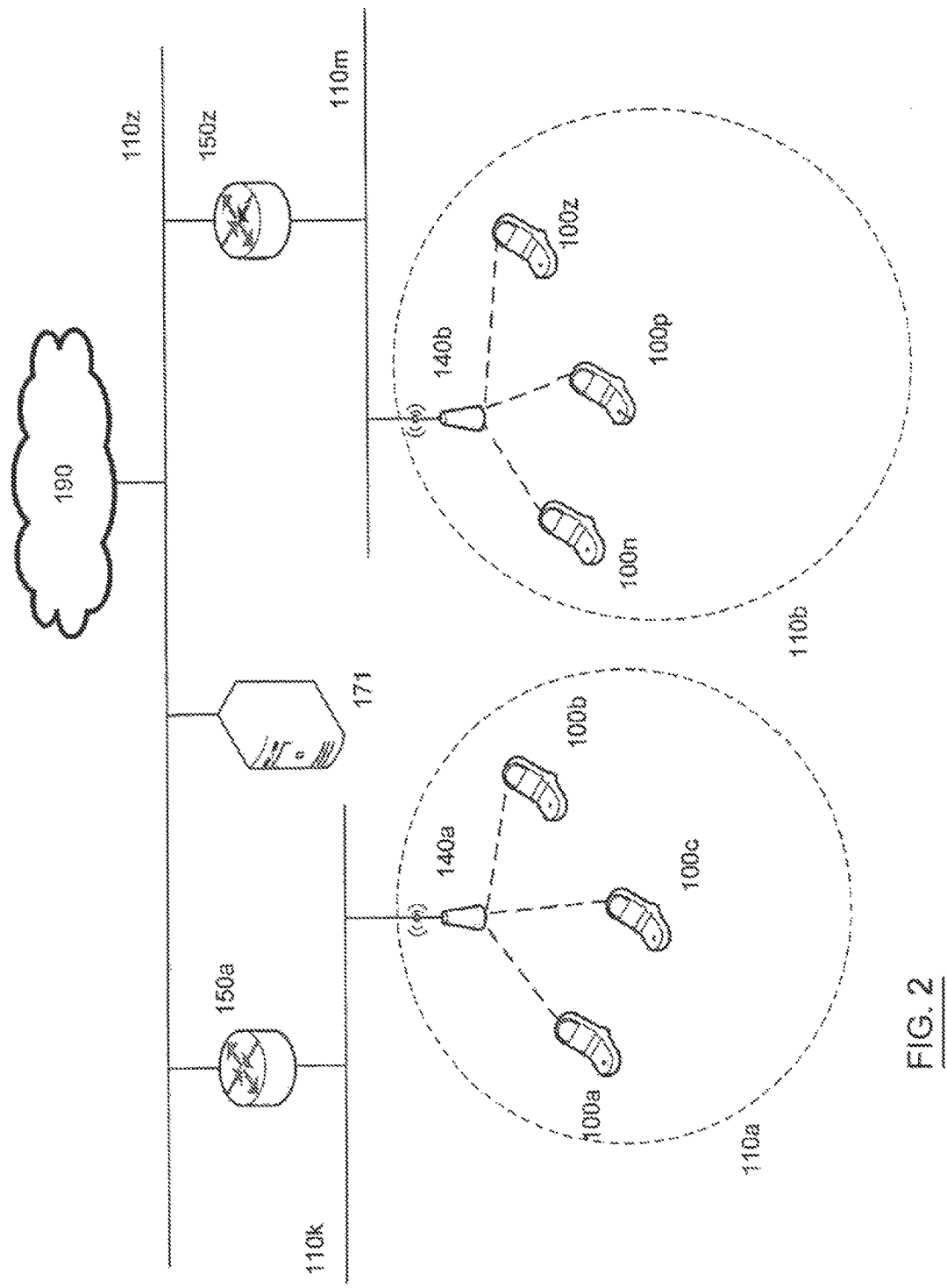
FIG. 2 depicts a network-level layout of a data collection system utilizing RFID readers according to one embodiment.

In a further aspect, the RFID reader can be incorporated in a data collection system. The data collection system, schematically shown in FIG. 2, can include a plurality of RFID readers 100a-100z in communication with a plurality of interconnected networks 110a-110z. In one aspect, the plurality of networks 110a-110z can include at least one wireless communication network. In a further aspect, a RFID reader can comprise a communication interface which can be used by the terminal to connect to one or more networks 110a-110z. In one embodiment, the communication interface can be provided by a wireless communication interface.

The RFID reader 100c can establish a communication session with the host computer 171. In one embodiment, network frames can be exchanged by the RFID reader 100c and the host computer 171 via one or more routers, base stations, and other infrastructure elements. In another embodiment, the host computer 171 can be reachable by the RFID reader 100c via a local area network (LAN). In a yet another embodiment, the host computer 171 can be reachable by the RFID reader 100c via a wide area network (WAN). A skilled artisan would appreciate the fact that other methods of providing interconnectivity between the RFID reader 100c and the host computer 171 relying upon LANs, WANs, virtual private networks (VPNs), and/or other types of network are within the scope of this disclosure.

In one embodiment, the communications between the RFID reader 100c and the host computer 171 can comprise a series of HTTP requests and responses transmitted over one or more TCP connections. In one embodiment, the communications between the RFID reader 100c and the host computer 171 can comprise VoIP traffic transmitted over one or more TCP and/or UDP ports. A skilled artisan would appreciate the fact that using other transport and application level protocols is within the scope and the spirit of the invention.

In one aspect, at least one of the messages transmitted by the RFID reader can include decoded message data corresponding to, e.g., a bar code label or a RFID label attached to a product or to a shipment item. For example, a RFID reader can transmit a request to the host computer to retrieve product information corresponding to a product identifier encoded by a bar code label attached to the product, or to transmit an item tacking record for an item identified by a bar code label attached to the product.

Component-level diagram of one embodiment of a RFID reader is now being described with reference to FIG. 3. RFID reader 100 can comprise at least one microprocessor 310 and a memory 320, both coupled to the system bus 370. The microprocessor 310 can be provided by a general purpose microprocessor or by a specialized microprocessor (e.g., an ASIC). In one embodiment, RFID reader 100 can comprise a single microprocessor which can be referred to as a central processing unit (CPU). In another embodiment, RFID reader 100 can comprise two or more microprocessors, for example, a CPU providing some or most of the RFID reader functionality and a specialized microprocessor performing some specific functionality. A skilled artisan would appreciate the fact that other schemes of processing tasks distribution among two or more microprocessors are within the scope of this disclosure.

RFID reader 100 can further comprise a communication interface 340 communicatively coupled to the system bus 370. In one embodiment, the communication interface can be provided by a wireless communication interface. The wireless communication interface can be configured to support, for example, but not limited to, the following protocols: at least one protocol of the IEEE 802.11/802.15/802.16 protocol family, at least one protocol of the HSPA/GSM/GPRS/EDGE protocol family, TDMA protocol, UMTS protocol' LTE protocol and/or at least one protocol of the CDMA/1xEV-DO protocol family.

RFID reader 100 can further comprise a keyboard interface 354 and a display adapter 355, both also coupled to the system bus 370. RFID reader 100 can further comprise a battery 356. In one embodiment, the battery 356 can be provided by a replaceable rechargeable battery pack.

RFID reader 100 can further comprise a GPS receiver 380. RFID reader 100 can further comprise at least one connector 390 configured to receive a subscriber identity module (SIM) card.

RFID reader 100 can further comprise one or more reading devices 330, provided, for example, but not limited to, by a RFID reading device, a bar code reading device, or a card reading device. In one embodiment, the RFID terminal can be configured to read an encoded message using reading device 330, and to output raw message data containing the encoded message. In another embodiment, the RFID terminal can be configured to read an encoded message using reading device 330, and to output decoded message data corresponding to the encoded message. As used herein, "message" is intended to denote a character string comprising alphanumeric and/or non-alphanumeric characters according to one embodiment. An encoded message can be used to convey information, such as identification of the source and the model of a product, for example, in a UPC code.

Of course, devices that read bar codes, read RFID, or read cards bearing encoded information may read more than one of these categories while remaining within the scope of this disclosure. For example, a device that reads bar codes may include a card reader, and/or RFID reader; a device that reads RFID may also be able to read bar codes and/or cards; and a device that reads cards may be able to also read bar codes and/or RFID. For further clarity, it is not necessary that a device's primary function involve any of these functions in order to be considered such a device; for example, a cellular telephone, smartphone, or PDA that is capable of reading bar codes is a device that read bar codes for purposes of this disclosure.

As noted herein supra, in one embodiment, RFID reader 100 can further comprise a RFID reading device 333. RFID reader 100 can be configured to read RFID tags containing decoded messages. In one embodiment, the RFID terminal can be configured to read, using RFID reading device 333, a RFID tag containing an encoded message, and to output raw message data containing the encoded message. In another embodiment, the RFID terminal can be configured to read, using RFID reading device 333, a RFID tag containing an encoded message, and to output decoded message data corresponding to the encoded message.

In a further aspect, the RFID reading device can comprise an antenna 338. In one embodiment, the antenna 338 of FIG. 3 can be provided by a metamaterial (MTM) antenna.

Metamaterials are artificial composite materials engineered to produce a desired electromagnetic behavior which surpasses that of natural materials. MTM-based objects can include structures which are much smaller than the wavelength of electromagnetic waves propagating through the material. MTM technology advantageously allows for precise control of the propagation of electromagnetic waves in the confines of small structures by determining the values of operating parameters which can include operating frequency, bandwidth, phase offsets, constant phase propagation, matching conditions, and number and positioning of ports.

In one aspect, an MTM antenna can be physically small as compared to other types of antennas: an MTM antenna can be sized, for example, on the order of one tenths of a signal's wavelength, while providing performance equal to or better than an antenna made of a conventional material and sized on the order of one half of the signal's wavelength. Thus, for a frequency range of 860 MHz-930 MHz, an MTM antenna can have a size of 3.2 m.

The ability of an MTM antenna to produce a desired electromagnetic behavior can be explained by the fact that while most natural materials are right-handed (RH) materials (i.e. propagation of electromagnetic waves in natural materials follows the right-hand rule for the trio (E, H, β), where E is the electrical field, H is the magnetic field, and β is the phase velocity) exhibiting a positive refractive index, a metamaterial due to its artificial structure can exhibit a negative refractive index and follow the left-hand rule for the trio (E, H, β). A metamaterial exhibiting a negative refractive index can be a pure left-handed (LH) metamaterial by simultaneously having negative permittivity and permeability. A metamaterial can combine RH and LH features (Composite Right and Left Handed (CRLH) materials).

Figure 3:
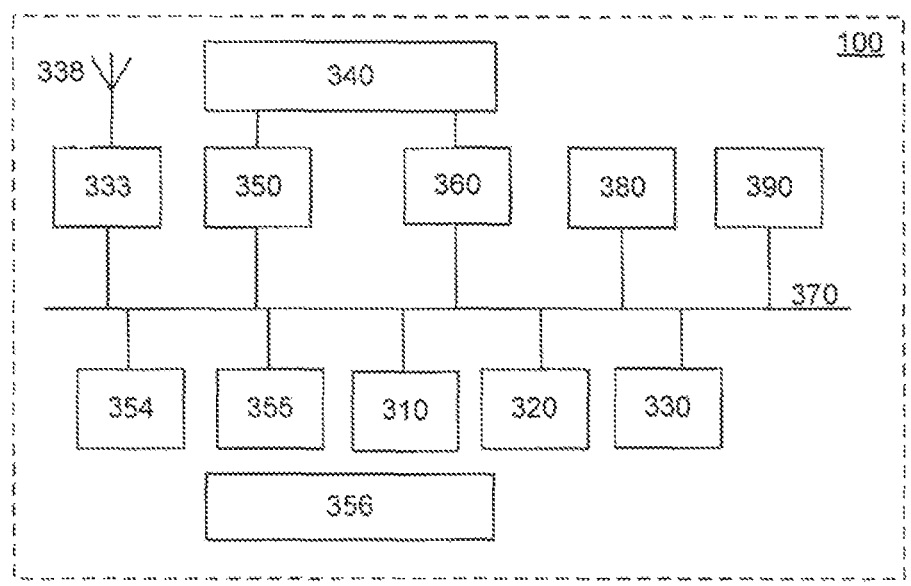
FIG. 3 depicts component-level layout of a RFID reader according to one embodiment.
Figure 4A:
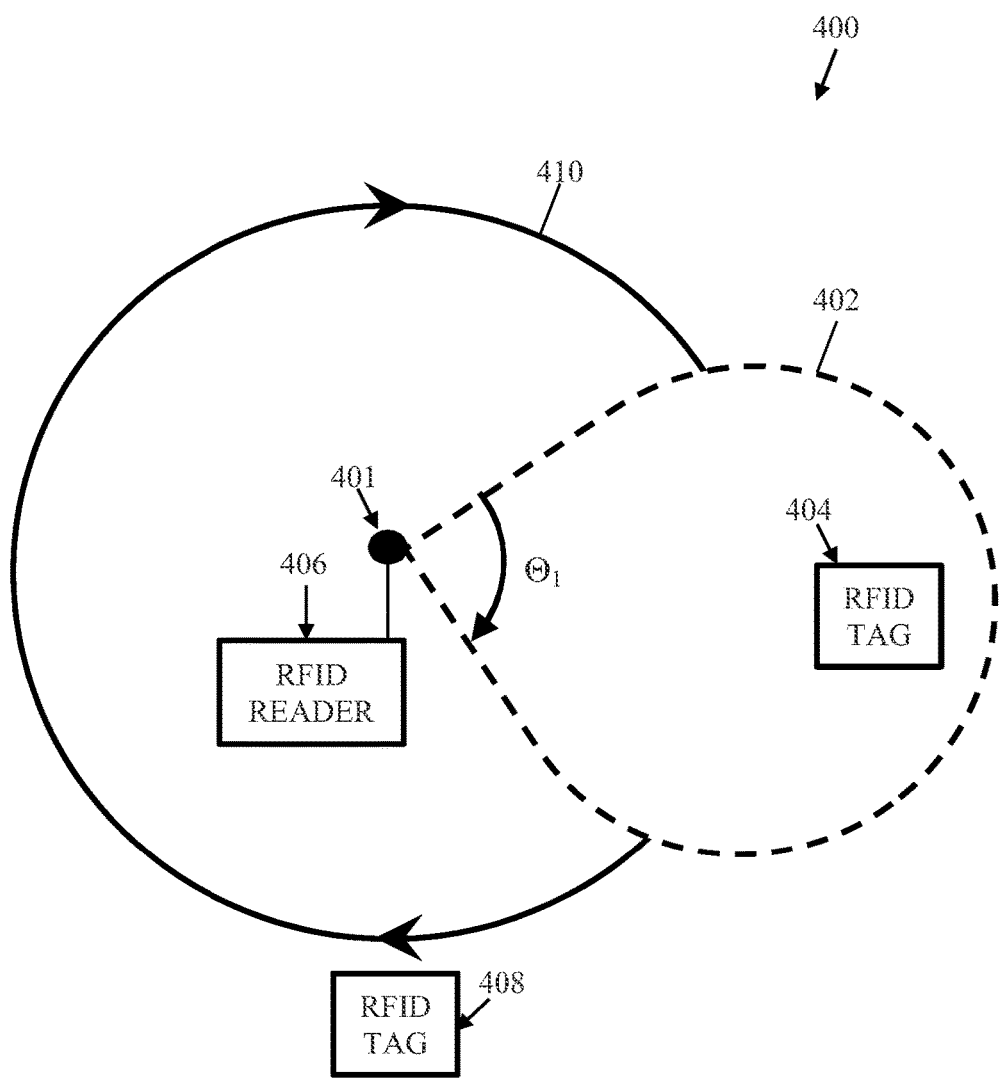
FIG. 4A illustrates a directional RFID antenna system having a directional antenna according to one embodiment.

In one embodiment, antenna 338 of FIG. 3 can be provided by an MTM antenna 400 shown in FIG. 4A. In one embodiment, the conductive feed line 416 coupling with the conductive cell patch 402 creates a capacitance by the proximity of the conductive feed line 416 with the conductive cell patch 402. Additionally, the via 404 may connect to a stripline (not shown) that extends to a ground plane, which acts as an inductor. Thus, the MTM antenna of FIG. 4A may be an "LC" circuit which creates a transmission line antenna.

In one embodiment, feed pad 414 can be electrically coupled to coaxial cable connector (not shown). In one embodiment, the coaxial cable connector can be connected from the bottom side of antenna 400. In another embodiment, the coaxial cable connector can be connected from a lateral side of antenna 400. In a yet another embodiment, feed pad 414 can be electrically coupled to a twisted cable.

Also disposed on the top surface of dielectric substrate 410 can be one or more ground planes provided, e.g., by one or more metallic plates.

One or more conductive cell patches 402 can be connected by one or more vias 404 to one or more conductive via lines (not shown) disposed on the bottom surface of dielectric substrate 410. At least one conductive via line can comprise a via line tuner (not shown) provided by a conductive strip having a curved line form or an open polygon line form. A via line tuner can be used to adjust resonant frequency of antenna 400 as explained herein infra. Also disposed on the bottom surface of dielectric substrate 410 can be a bottom ground plane.

Directional Antenna Systems

RFID tags may be used in trucking and warehousing environments. On some occasions, the user needs to locate a specific package among a group of packages. To facilitate finding specific RFID tags in a larger group, RFID readers can be constructed with antennas having an antenna sensitivity patterns that peaks in a forward direction. This then allows the user to point the reader towards the desired RFID tag. In this regard, the RFID antenna could have a conical radiation pattern starting at the antenna and expanding toward one direction.

FIG. 4A illustrates a directional RFID antenna system having a directional antenna according to one embodiment. As shown, a mobile device, such as an RFID reader 406, has a directional antenna 401 having a radiation pattern 402 generally in one direction away from the antenna 401.

The directional antenna 401 may be any antenna that has a radiation pattern generally directed in a single direction (shown to the right or forward direction in FIGS. 4A). For example, the directional antenna may be a patch antenna, a loop antenna (such as a magnetic loop antenna), a horn antenna, or some other antenna which has a directional radiation pattern. In one embodiment, multiple directional antennas are employed which sweep about at least one axis (e.g., one antenna that sweeps about the x-axis, one antenna that sweeps about the y-axis, and one antenna that sweeps about the z-axis). In this regard, according to one embodiment, a first directional antenna that is disposed perpendicular to a second directional antenna.

The directional antenna 401 sweeps radially about the RFID reader as shown by the solid circular line having arrows in FIG. 4. In this regard, the directional antenna 401 may rotate or sweep about in a full circular motion about an axis about the antenna 401 so that the radiation pattern will encompass RFID tags in any direction about the axis on a timing basis. In this regard, when the radiation pattern 402 encompasses an RFID tag (such as RFID tag 404), the RFID reader 406 interrogates and reads RFID tag 404 (i.e., receives a return signal from the RFID tag 404) but does not interrogate or read RFID tag 408 since RFID tag 408 is outside of the radiation pattern 402. However, when radiation pattern 402 sweeps to RFID tag 408, RFID tag 408 is interrogated and read but RFID tag 404 is not interrogated or read because it is outside of the range of the radiation pattern 402.

When each RFID tag is interrogated and read, the system may immediately record the direction of the antenna 401 at the time when the RFID tag is read and the radial resolution thereof and associates such direction with RFID tag. For example, when RFID tag 404 is interrogated and read, the system simultaneously determines the direction of the antenna and records such direction with data (e.g., the RFID identifier, received strength signal indication (RSSI), etc.) received from the RFID tag 404. This regard, the RFID reader, mobile device, or system can determine the location of an RFID tag and the distance from the antenna 401 based on the received RSSI of the RFID tag.

Figure 4B:
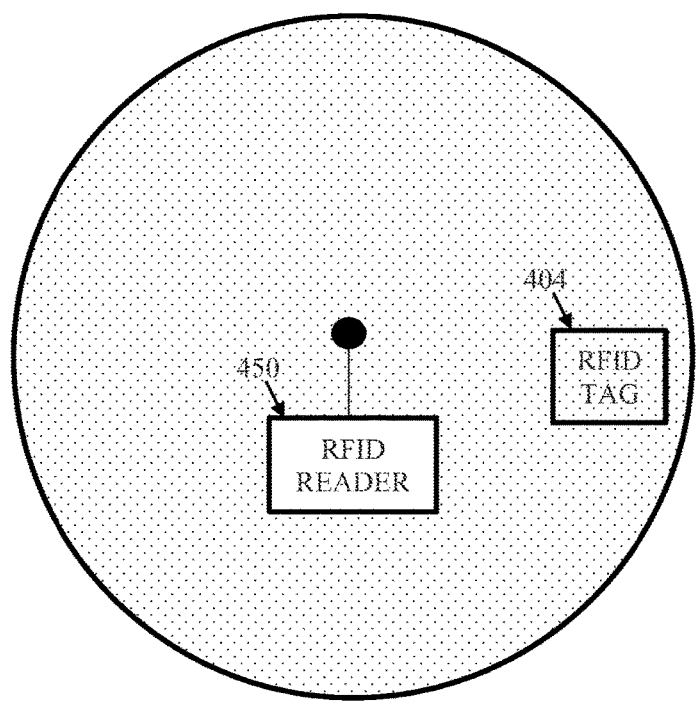
FIG. 4B illustrates part of a RFID antenna system having an exemplary omnidirectional antenna according to one embodiment.

FIG. 4B illustrates an omnidirectional antenna (e.g., the first antenna) of RFID reader 450 which may be used to detect the presence of the RFID tag 404. The radiation pattern (shown as the circular pattern around the RFID reader 450) of the antenna of RFID reader 450 is shown as being in all directions, including in a 3-dimensional space. The antenna of RFID reader 450 may be used to power any RFID tags within the radiation pattern.

Figure 5A:
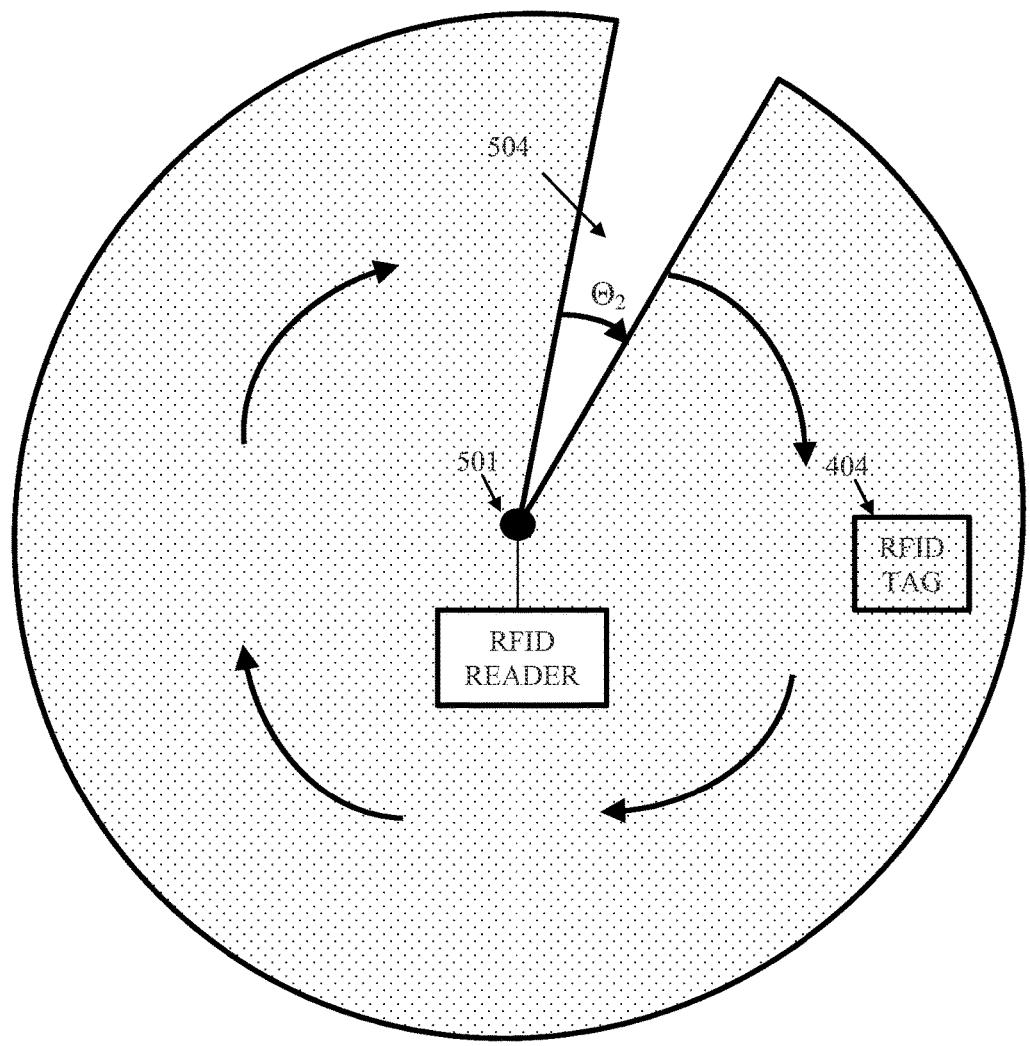
FIG. 5A illustrates a directional RFID antenna system using a null antenna according to one embodiment.
Figure 5B:
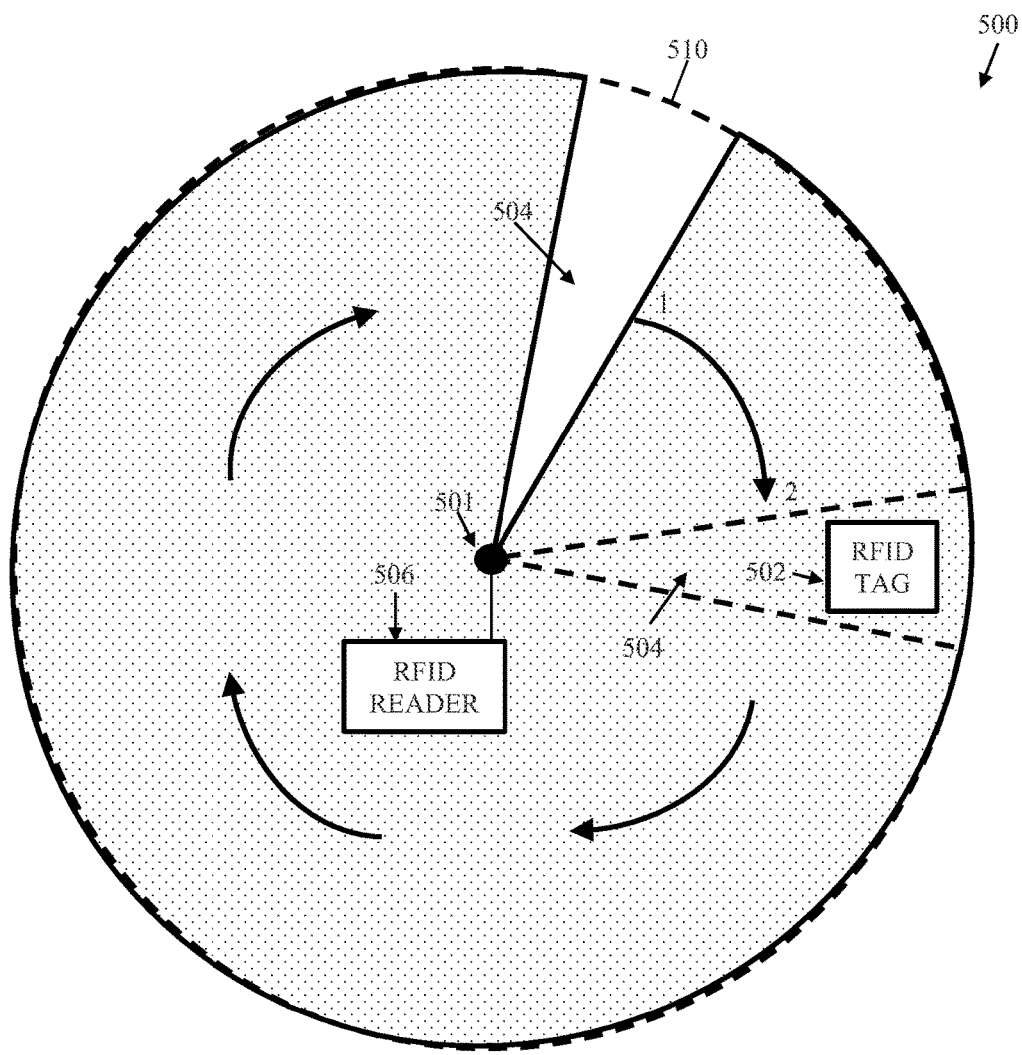
FIG. 5B illustrates operation of a directional RFID antenna system having a null antenna according to another embodiment.

FIGS. 5A-5B (collectively FIG. 5) illustrate a directional RFID antenna system using a null antenna according to one embodiment. However, it is noted that, for some directional antennas, the directional sensitivity radiation patterns of the antenna described above in FIG. 4 may be fairly broad, thereby limiting the angular resolution when searching for specific RFID tags. The angular resolution can be improved by using an antenna that is designed to have a signal null or minimum in the forward direction. Such null or minimum patterns may be much sharper and well defined than the maximum patterns. The antenna would identify RFID tags falling within the radiation pattern but would not identify RFID tags at the null or minimum area. When the antenna sweeps about an axis, the antenna would identify where each RFID tag is located because the RFID tag would not be identified when the null or minimum area of the radiation pattern is over the RFID tag. FIG. 5 illustrates such embodiment.

In FIG. 5, an RFID reader 506 (which may be one or more RFID readers) may have a null or minimum pattern antenna 501. Antenna 501 (which may be one or more null or minimum pattern antennas) has a radiation pattern (shown as the solid circular line about antenna 501) which has a null 504. Antenna 501 is configured to sweep from position 1 (the solid circular line) to position 2 (the dotted circular line 510) about an axis so that the null pattern 504 sweeps about such axis. The radiation pattern areas other than the null or minimum area are configured to interrogate and read RFID tags falling therein. However, the RFID reader 506 cannot interrogate and read RFID tags falling in the null or minimum area 504 of the radiation pattern. For example, RFID tag 502 is read when the radiation pattern of antenna 510 is orientated at position 1 and the system 500 records RFID tag is located (multiple reads occur while the RFID tag is within the radiation pattern of antenna 501), the time of each read of the RFID tag 502 and possibly other data of the RFID tag 502, such as the RSSI to determine the distance of RFID tag 502 from RFID reader 506. However, RFID tag 504 is not read when the null or minimum area 504 rotates about antenna 501 with position 2 of the radiation pattern so that RFID tag 504 is no longer within the radiation pattern. In this regard, the system 500 records that RFID tag 502 is no longer read and the time of non-recording. When the antenna 501 continues to rotate in the same direction (as shown in FIG. 5), the RFID tag 502 again is encompassed in the radiation pattern (i.e., not in the null or minimum area) of antenna 501. The data of RFID tag 502 is again recorded, including the time of recording, the RSSI strength, the radial location of the null or minimum area, and/or any other information about the RFID tag and/or the antenna pattern. In this regard, the system 500 determines the times that the RFID tag is within the radiation pattern coupled with the radial location of the null or minimum area of the radiation pattern, and also determines the time that the RFID tag is within the null or minimum area of the radiation pattern coupled with the radial location of the null or minimum area of the radiation pattern. As such, the system determines the location of the RFID tag based on when the RFID tag is within the null or minimum area and also may know the distance from the antenna based on the RSSI data received from the RFID while in the radiation pattern. Thus, the RFID tag can be located with a null pattern antenna.

Figure 6:
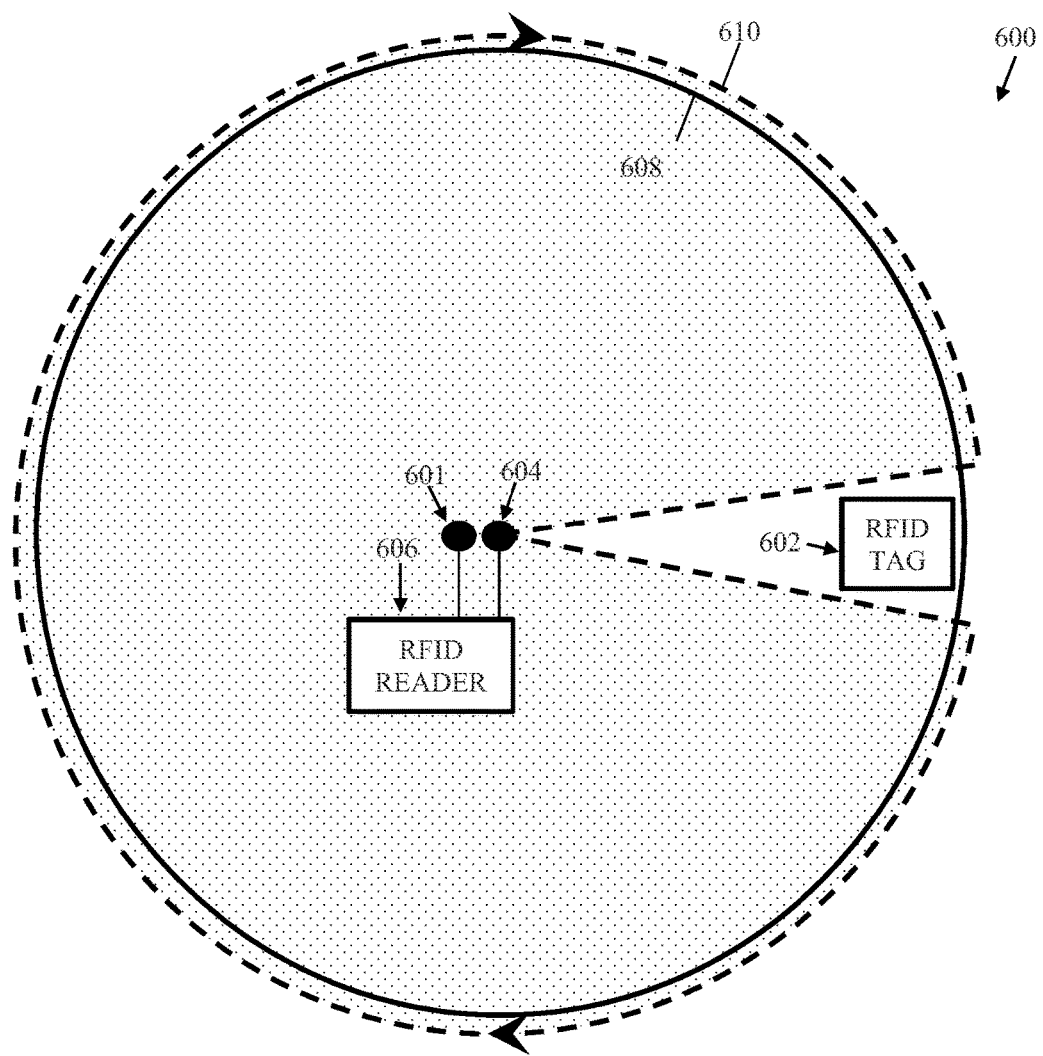
FIG. 6 illustrates a directional RFID antenna system using a null antenna and an omnidirectional antenna according to one embodiment.

FIG. 6 illustrates the null antenna system of FIG. 5 but with an added omnidirectional antenna from FIG. 4A according to one embodiment. As illustrated, radiation pattern 610 is the same as radiation pattern 510, null pattern antenna 601 is the same as null pattern antenna 501, RFID tag 602 is the same as RFID tag 502, and RFID reader 606 may be the same as RFID reader 506, according to some embodiments. The RFID reader 506 (which may be one or more RFID readers) may have an added omnidirectional antenna 604 to find the general location for the desired RFID tag (and/or power the desired RFID tag) and then use a null antenna to achieve a finer angular resolution as mentioned above. Thus, in the embodiment of FIG. 5, only the null antenna 601 would be active (and the null or minimum 504 would sweep about an axis about the null antenna 601), but in the embodiment of FIG. 6 both antennas 601 and 604 are active. In the latter embodiment where both antennas are active at the same time, the operator would maximize the signal coming from the peaking antenna while at the same time minimize the signal coming from the nulling antenna.

It is also possible that if the RFID tag 602 is a passive RFID tag, that the RFID tag 602 may be energized with the maximizing omnidirectional antenna 604 while at the same time minimizing with the nulling antenna 601.

In another configuration, the system might switch alternately between the two different types of antennas mentioned above.

The following description describes various ways to modify antennas to work with the present embodiments.

It should be noted that the antennas systems 400-600 of FIGS. 4-6 may be any plurality of antennas and need not be limited to only two antennas. For example, the antenna systems 400-600 may have more than two antennas, such as a set of three antennas, four antennas, or any other antenna array.

Additionally, it should be understood that the antennas systems 400-600 of FIGS. 4-6 may be any type of antenna, and therefore, may be a metamaterial ("MTM") antenna in addition to the above mentional antennas. In this regard, according to one aspect, the antennas discussed above can be broadband, ultrawideband (UWB), or multiband (MB). The antennas can therefore be designed to support the desired functionality and characteristics. Antenna size, resonant frequencies, bandwidth, and matching properties can be controlled by changing the antenna design parameters, the length and width of the antenna, the length and width of any components of stripline antennas, the material and thickness of the substrate for stripline antennas, and various other dimensions and layouts.

In a further aspect, RFID reading device or reader can be compliant with EPC™ Class-1 Generation-2 UHF RFID Protocol for Communications at 860 MHz-960 MHz by EPCglobal, commonly known as the "Gen 2" standard, which defines physical and logical requirements for a passive-backscatter, Interrogator-talks-first (ITF) RFID system operating in the 860 MHz-960 MHz frequency range.

In one embodiment, RFID reader 100 can transmit information to a passive RFID tag by modulating an RF signal in the 860-960 MHz frequency range. An RFID tag can receive both information and operating energy from the RF signal transmitted by the RFID reader. The RFID reader can receive information from the RFID tag by transmitting a continuous-wave (CW) RF signal to the RFID tag. "Continuous wave" can refer to any waveform transmitted by an RFID reading device and suitable to power a passive RFID tag, e.g., a sinusoid at a given frequency. The RFID tag can respond by modulating the reflection coefficient of its antenna, thus backscattering an information signal to the RFID reader. In one embodiment, the RFID tag can modulate the reflection coefficient of its antenna only responsive to receiving an RFID signal from RFID reader.

Figure 7:
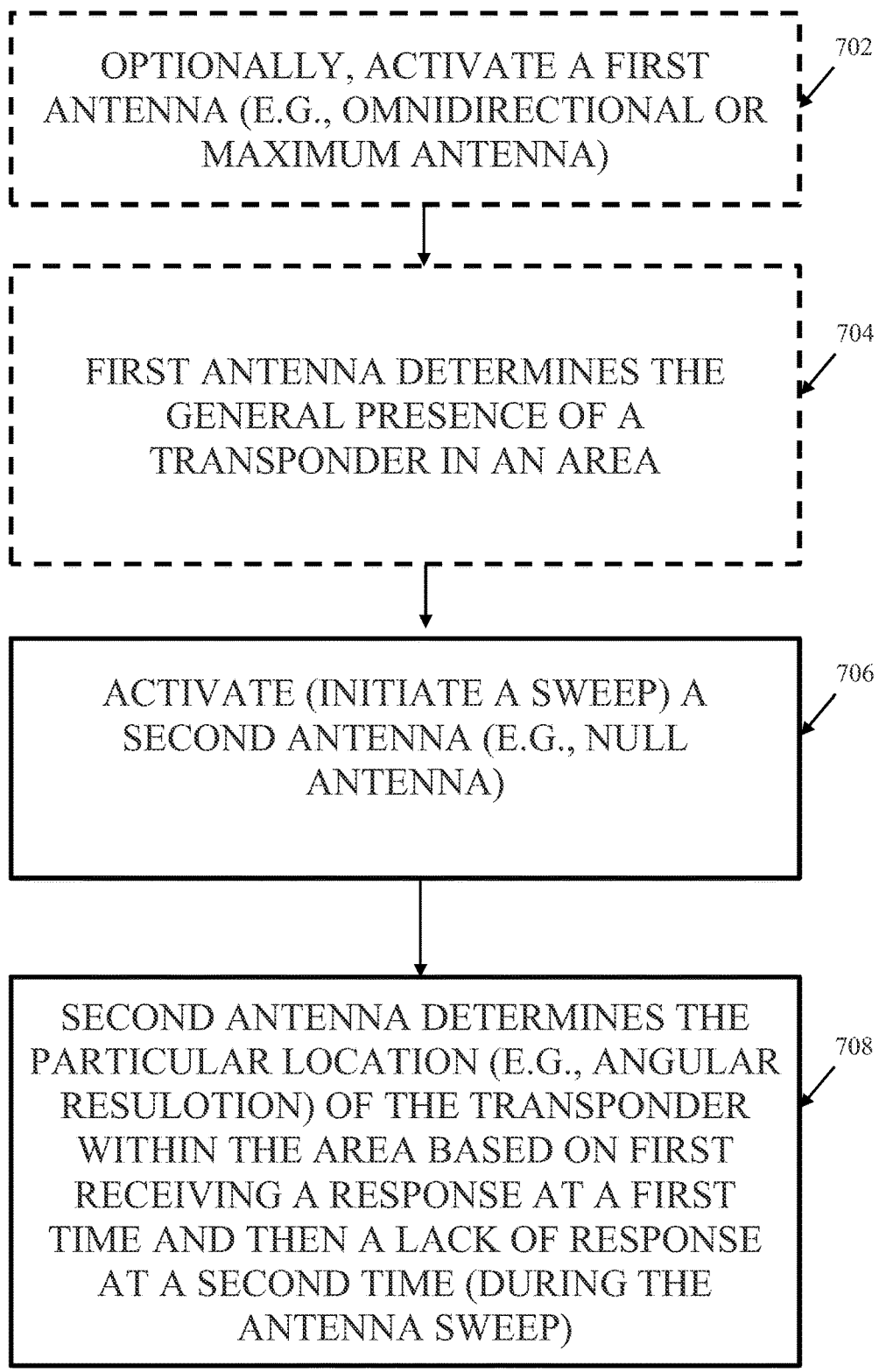
FIG. 7 illustrates a method for identifying a location of an RFID tag according to some embodiments.

FIG. 7 illustrates a method for identifying a location of an RFID tag according to some embodiments. In 702, the first antenna is activated. As mentioned above, the first antenna may be an omnidirectional antenna. In 704, the first antenna may determine the general presence of the transponder in an area. It is noted that steps 702 and 704 are optional and are thus, not required in performing the present invention.

In 706, a second antenna is activated. As previously discussed the second antenna may be a null antenna having a null or minimum in a first direction and a radiation pattern in all directions other than the first direction. The second antenna is configured to sweep about the antenna's axis (or another predetermined axis) as shown in FIG. 5B. In 708, the second antenna first receives a signal from an RFID tag at a first time while the maximum radiation pattern is directed at the RFID tag, and thereafter, while the second antenna continues its sweep about the antenna's axis, the second antenna does not receive a signal when the null or minimum of the second antenna is directed to the RFID tag. As such, one can determine the location of the RFID tag as being where the null or minimum is pointing at the time that no signal is received (after receiving a signal from said RFID tag). In other words, when no signal is received (after receiving a signal from the tag), the user knows the RFID tag is located at the position based on the time and angular resolution corresponding to such time when the signal is not received by the RFID reader. This presumes that the RFID reader is not substantially moving relative to the RFID tag desired to be read.

While the present invention has been particularly shown and described with reference to certain exemplary embodiments, it will be understood by one skilled in the art that various changes in detail may be affected therein without departing from the spirit and scope of the invention as defined by claims that can be supported by the written description and drawings. Further, where exemplary embodiments are described with reference to a certain number of elements it will be understood that the exemplary embodiments can be practiced utilizing less than the certain number of elements.

I claim:

1. A method comprising:
   activating a first antenna;
   determining, by the first antenna, a general presence of a transponder in an area based on a signal received at the first antenna from the transponder;
   while the first antenna is activated, activating a second antenna designed to have a null or minimum in a first direction and a radiation pattern in all directions other than the first direction so that first signals transmitted by the first antenna indicate a transponder is within an area while second signals of the second antenna indicate a direction of the transponder in the area;
   while the first antenna determines that the transponder is in the area, identifying, by the second antenna, a direction the null or minimum is directed toward when a lack of response to the second antenna occurs; and
   determining, by a processor, a location of the transponder within the area based on (1) the first antenna determining that the transponder is in the area, (2) the direction the null is directed toward when the lack of response is received by the second antenna, and (3) multiple reads of the transponder within the radiation pattern.

2. The method of claim 1, wherein the identifying, using the second antenna, the transponder's location comprises sweeping the second antenna about an axis.

3. The method of claim 1, wherein the first antenna comprises an omnidirectional antenna configured to have a radiation pattern in all directions.

4. The method of claim 3, wherein the first antenna determines the presence of a transponder in the area prior to the identifying the transponder location's within the area.

5. The method of claim 3, wherein the omnidirectional antenna powers the transponder while the second antenna determines the location of the transponder within the area.

6. The method of claim 1, wherein the transponder's location is determined by identifying an angular resolution of the transponder relative to the second antenna.

7. An apparatus comprising:
   a first antenna to determine a presence of a transponder within an area; and
   a second antenna that is activated in combination with a first antenna, wherein the second antenna comprising a directional radiation pattern is configured to sweep the area to determine a direction of the transponder while the first antenna determines the presence of the transponder is within the area, wherein the first antenna is separate from the second antenna, and wherein the second antenna is configured to generate a radiation pattern that includes a null in a first direction;
   a third antenna that is perpendicular to the second antenna and which sweeps about an axis that is perpendicular to a sweeping axis of the second antenna; and
   a processor that determines a location of the transponder within the area based on (1) the first antenna determining that the transponder is in the area, (2) the direction the null is directed toward when a lack of response is received by the second antenna, and (3) multiple reads of the transponder within the radiation pattern.

8. The apparatus of claim 7, wherein the first antenna comprises an antenna having an omnidirectional radiation pattern so as to determine whether the transponder is within the area in any direction.

9. The apparatus of claim 7, wherein at least one transponder is a passive transponder, and wherein the first antenna transmits electromagnetic power to power the at least one transponder.

10. The apparatus of claim 7, wherein the second antenna is active while the first antenna is deactivated.

11. The apparatus of claim 7, wherein the second antenna comprises a nulling antenna comprising a null pattern in one direction.

12. The apparatus of claim 7, wherein the second antenna is configured to continuously sweep about an axis, and, while the second antenna is continuously sweeping, the second antenna sends interrogation signals and record data regarding any transponders responding to any of the interrogation signals.

13. The apparatus of claim 7, wherein the first antenna comprises at least one of a horn antenna, a patch antenna, or a metamaterial antenna.

14. The apparatus of claim 7, wherein the first and second antennas are active simultaneously.

15. The apparatus of claim 7, wherein a directional pattern of the first antenna only receives response signals from the transponder when the transponder is encompassed by the directional radiation pattern.

16. A system comprising:

a RFID reader comprising a nulling antenna;

wherein the nulling antenna outputs a null or minimum extending only in one direction so that when the null is directed toward a transponder, the RFID reader is prevented from receiving signals from the transponder, and wherein, while an omnidirectional antenna determines that the transponder is in an area, the nulling antenna continuously sweeps about an axis to determine: (1) a presence based on receipt of the signal when a maximum of the omnidirectional antenna is directed toward the transponder in the area and (2) a direction of the nulling antenna when a lack of signal from the transponder is received, wherein a first signal transmitted by the omnidirectional antenna is maximized and a nulling signal transmitted by the nulling antenna is minimized at the same time; and wherein a processor determines a location of the transponder based on (1) the nulling antenna determining that the transponder is present in proximity of the nulling antenna, and (2) the direction the null is directed toward when a lack of response is received by the nulling antenna, and (3) multiple reads of the transponder within the area.

17. The system of claim 16, wherein the nulling antenna has a radiation pattern which extends in all directions except for the direction of the null or minimum so that the null or minimum sweeps about the axis.

18. The system of claim 16, wherein the nulling antenna is configured to receive signals from the transponder when the transponder is within a range of the nulling antenna and is directionally located outside of the null or minimum.

19. The system of claim 16, wherein the RFID reader further comprises an omnidirectional antenna that is active concurrently with the null or minimum and which is configured to determine the presence of the transponder while the nulling antenna determines the location of the transponder.

* * * * *